US008535775B2

(12) United States Patent
Ohno et al.

(10) Patent No.: US 8,535,775 B2
(45) Date of Patent: Sep. 17, 2013

(54) OPTICAL RECORDING MEDIUM (75) Inventors: Takashi Ohno, Tokyo (JP); Yoshihiro Noda, Tokyo (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 0 days.

(21) Appl. No.: 13/331,691

(22) Filed: Dec. 20, 2011

(65) Prior Publication Data
US 2012/0148784 A1 Jun. 14, 2012

Related U.S. Application Data (63) Continuation of application No. PCT/JP2010/060492, filed on Jun. 21, 2010.

(30) Foreign Application Priority Data

Jun. 24, 2009 (JP) ................................. 2009-149723

(51) Int. Cl.
*G11B 7/24* (2006.01)
(52) U.S. Cl.
USPC ....... 428/64.1; 428/64.4; 428/64.5; 428/64.6; 430/270.13
(58) Field of Classification Search
USPC .................................. 428/64.4; 430/270.13
See application file for complete search history.

(56) References Cited

U.S. PATENT DOCUMENTS 7,524,548 B2 * 4/2009 Shingai et al. ............... 428/64.4
2007/0271576 A1 11/2007 Tabata et al.

FOREIGN PATENT DOCUMENTS

| JP | 2005-182961 | 7/2005 |
| JP | 2006-085875 | 3/2006 |
| JP | 2007-172717 | 7/2007 |
| JP | 2007-323743 | 12/2007 |
| WO | WO 2008/132940 | 11/2008 |

OTHER PUBLICATIONS

International Search Report issued Aug. 24, 2010 in PCT/JP2010/060492 filed Jun. 21, 2010.
Office Action issued May 17, 2013 in JP Patent Application No. 2010-141402 with English Translation.

* cited by examiner

*Primary Examiner* — Elizabeth Mulvaney
(74) *Attorney, Agent, or Firm* — Oblon, Spivak, McClelland, Maier & Neustadt, L.L.P.

(57) ABSTRACT

A multilayer-type optical recording medium having a translucent recording/reproducing functional layer containing a first protective layer, a second protective layer, a recording layer, a third protective layer, a reflective layer and a fourth protective layer in this order relative to incident laser light. The second protective layer and the fourth protective layer are made of the same kind of material. The refractive index of the second protective layer is higher by at least 0.3 than the refractive index of the first protective layer. When the film thickness of the second protective layer is set as D2, the film thickness of the fourth protective layer is set as D4, and the reflectivity before recording when the laser light is focused on the recording layer is set as R, the derivatives $d(R)/d(D2)$ and $d(R)/d(D4)$ have opposite signs from each other.

9 Claims, 1 Drawing Sheet

OPTICAL RECORDING MEDIUM

TECHNICAL FIELD

The present invention relates to a multilayer type optical recording medium having plural recording layers.

BACKGROUND ART

In recent years, along with the increase of the amount of information, an optical recording medium having a higher capacity is demanded. As one method for obtaining a high capacity, a multilayer technique may be mentioned wherein a multilayer type optical recording medium is formed by laminating plural aggregates comprising one recording layer, a reflective layer required for recoding or reproducing information on the recoding layer, a protective layer, etc. (hereinafter, the aggregate is referred to as "recording/reproducing functional layer") with a distance at a level of optically dividing the aggregates, whereby the capacity is remarkably increased.

In general, since it is not necessary to increase the transmittance of a recording/reproducing functional layer outermost from the incidence side of laser light (hereinafter referred to as "outermost recording/reproducing functional layer") for a multilayer type optical recording medium, it is possible to design an optical recording medium similar to one layer type optical recording medium.

On the other hand, since recording/reproducing functional layers (hereinafter, referred to as "transmission recording/reproducing functional layer") other than the outermost recording/reproducing functional layer are required to have a predetermined transmittance, only a part of incident light is used for recording or reproducing information. Further, only a part of incident light is also used for recording or reproducing information on recording/reproducing functional layers other than the innermost recording/reproducing functional layer from the laser incidence side due to the existence of a recording/reproducing functional layer on its front side. That is why, as compared to one layer type optical recording media, information intensity obtained from each recording/reproducing functional layer in a multilayer type optical recording media is remarkably weak. Thus, a reproducing system for multilayer type optical recording media is required to read a weak information intensity, and many such reproducing techniques have been developed in recent years.

In general, a transmission recording/reproducing functional layer comprises a protective layer, a recording layer, a protective layer, a reflective layer and a protective layer in this order from the incidence side of laser light. It is considered that in order to improve the transmittance of the transmission recording/reproducing functional layer, a material having a high transmittance is used as a material for each layer constituting the transmission recording/reproducing functional layer, or the thickness of each layer constituting the transmission recording/reproducing functional layer is made to be thin. For example, it is considered that the recording layer or the reflective layer is made to be thin, however, since such a layer remarkably contributes to signal intensity thermally and optically, the thinner the recording layer or the reflective layer is, the more the recording/reproducing properties tend to deteriorate. Therefore, a thinner layer is preferred from the viewpoint of the transmittance, and it is not always possible to select a layer structure so as to form recording marks appropriately by giving priority to optimization of the recording property.

Therefore, in the case of the transmission recording/reproducing functional layer, the range of controlling the thickness of the reflective layer and the recording layer tends to be narrow inevitably. More accurately, the recording/reproducing properties including the reflectivity and the transmittance of the recording/reproducing functional layer are decided by the combination with a protective layer formed above or below the reflective layer or the recording layer, however, the range of controlling the film thickness or the like tends to be extremely narrow, as compared to a case where it is not necessary to lower the transmittance.

Further, particularly in a case of rewritable phase change type optical recording media, a reflective layer has a role to transmit heat from a phase change recording layer which has absorbed laser light and to form proper amorphous marks. In experiments, by providing a thick reflective layer having a large heat conductivity, an optical recording medium on which recoding and deleting information can be easily carried out can be designed. However, it is practically very difficult to design an optical recording medium having a thin reflective layer in order to produce multilayer type optical recording media.

Nonetheless, in a case of a recording/reproducing functional layer at the laser light incidence side in a rewritable phase change type optical recording medium having two recording/reproducing functional layers, if a recording linear rate is not high, signal properties required for commercialization can be obtained by using an Ag alloy at a level of 10 nm as a reflective layer, and carefully designing a film thickness of a recording layer, a protective layer, etc. However, it is difficult to apply such a technique to multilayer type optical recording media having more than two layers at the present stage, and it is also not expected to have the recording linear rate improved.

Next, a protective layer between a recording layer and a reflective layer is a layer for releasing heat from a recording layer heated by absorbing light energy to the reflective layer. Depending on the thickness of the protective layer, the heat release property from the recording layer can be controlled. However, since the range of controlling the thickness of the recording layer and the reflective layer is narrow, the thickness of the protective layer to obtain an appropriate heat release property is almost decided. Therefore, the range of controlling the thickness of the protective layer is small, and in general, the thickness of the protective layer is thinner than the two other protective layers.

Thus, the transmittance of the recording/reproducing functional layer is controlled by two outer protective layers in most cases.

The transmittance of the two outer protective layers is controlled by controlling the reflectivity by utilizing an interference effect of a material (dielectric) used for the two outer protective layers. Usually, the refractive index of transparent resins and substrates is about 1.5 in many cases. However, by making the recording/reproducing functional layer have a higher refractive index than the transparent resin and the substrate which sandwich the recording/reproducing functional layer, the reflectivity can be freely controlled.

Further, since the thickness of the two outer protective layers is thick at a certain level in many cases, the two outer protective layers preferably have a high transparency, particularly preferably have a high transparency at the wavelength of laser light used for recording and reproducing (hereinafter sometimes referred to as "recording/reproducing laser wavelength"). In the optical recording medium, for example, recording/reproducing laser having a wavelength of at least 450 nm is used in many cases, and materials which are preferably used at the above wavelength are restricted.

Further, in a case where a protective layer having a thickness at a certain level is produced by sputtering or the like, a material which has a high film formation rate is preferred.

For the reason stated above, the material for the protective layer is required to satisfy properties such that the refractive index is high, the absorption is small, the film formation rate is high, etc., and as a preferred material, a material containing ZnS as a main component is preferably used. For example, $(ZnS)_{80}(SiO_2)_{20}$ or the like is widely used as a material for phase change optical disks (Patent Document 1).

PRIOR ART DOCUMENT

Patent Document

Patent Document 1: JP-A-2007-172717

DISCLOSURE OF INVENTION

Technical Problem

When the optical recording medium is produced, depending on the performance of apparatus (for example, sputtering apparatus) for forming recording/reproducing functional layers, the film thickness or the film quality of layers in the optical recording medium tends to be non-uniform. According to the study by the present inventors, due to the ununiformity of the film thickness or the film quality of layers in the optical recording medium, a problem results in the recording performance of the optical recording medium.

For example, if the film thickness of layers in the optical recording medium is non-uniform, the reflectivity becomes non-uniform. Particularly, in the case of the multilayer type optical recording media, transmission recording/reproducing functional layers are more remarkably impaired by the ununiformity of the film thickness or the film quality.

Here, since a material containing ZnS as the main component is an excellent material which has a high refractive index, of which light absorption is a little and which has a high film formation rate, the material containing ZnS is used for forming a protective layer in many cases, however, it is difficult to form a layer having a high uniformity of the film thickness.

Accordingly, the film thickness is likely to change in the optical recording medium, and it is difficult to obtain excellent recording/reproducing properties on the entire surface of the optical recording medium. This problem is particularly remarkable in the case of a translucent recording/reproducing functional layer other than the outermost recording/reproducing functional layer from the laser light incidence side.

In order to solve this problem, for example, it is considered to design a recording/reproducing functional layer such that even though the film thickness is changed, the recording/reproducing properties tend not to be influenced. However, as mentioned above, since the range of controlling the film thickness of each layer is narrow in the transmission recording/reproducing functional layer, and a problem that the recording/reproducing properties of the optical functional medium cannot be sufficiently controlled has not been solved.

Further, the problem of the ununiformity of the recording/reproducing properties due to the ununiformity of the film thickness is further remarkable in optical recording media using a short recording/reproducing laser wavelength. If the refractive index is not changed by the wavelength, the phase difference by the difference of optical paths due to the difference of the film thickness is in inverse proportion to the recording/reproducing laser wavelength. This tendency is one factor that the property distribution becomes correspondingly large, since if the film thickness becomes thick, the difference in the film thickness in the optical recording medium become large.

The present invention has been accomplished in order to solve the above problem, and it is an object of the present invention to obtain an optical recording medium which has an excellent uniformity of the reflectivity, the durability, the signal intensity, etc. in recording/reproducing functional layers other than the outermost recording/reproducing functional layer from the laser light incidence side in a multilayer type optical recording medium.

Solution to Problem

The present inventors have found that in an optical recording medium having a translucent recording/reproducing functional layer which comprises at least a first protective layer, a second protective layer, a recording layer, a third protective layer, a reflective layer and a fourth protective layer in this order from the incidence side of laser light, the above problem can be solved by controlling the film thickness of the second protective layer and the fourth protective layer, of which the film thickness can be controlled within a relatively broad range, so as to be in a specific relationship, and thus have accomplished the present invention.

That is, the gist of the present invention resides in an optical recording medium having a translucent recording/reproducing functional layer which comprises at least a first protective layer, a second protective layer, a recording layer, a third protective layer, a reflective layer and a fourth protective layer in this order from the incidence side of laser light, wherein the second protective layer and the fourth protective layer are made of a material having the same constituting elements, wherein the refractive index of the second protective layer is higher by at least 0.3 than the refractive index of the first protective layer, and wherein, when the film thickness of the second protective layer is set as D2, the film thickness of the fourth protective layer is set as D4, and the reflectivity before recording when the laser light is focused on the recoding layer is set as R, the positive and negative of increasing rates $d(R)/d(D2)$ and $d(R)/d(D4)$ relative to the film thickness of R are inverse.

Here, the second protective layer and the fourth protective layer are preferably made of a material containing ZnS.

Further, the first protective layer preferably has a film thickness of at least 12 nm and a refractive index of from 1.30 to 1.80 at the wavelength of recording/reproducing laser light.

Further, the second protective layer preferably has a film thickness of at most 25 nm.

Further, another gist the present invention resides in an optical recording medium having a translucent recording/reproducing functional layer which comprises at least a first protective layer, a second protective layer, a recording layer, a third protective layer, a reflective layer and a fourth protective layer in this order from the incidence side of laser light, wherein the second protective layer and the fourth protective layer are made of a material containing ZnS, wherein the first protective layer has a film thickness of at least 12 nm and a refractive index of from 1.30 to 1.80 at the wavelength of recording/reproducing laser light, and wherein the second protective layer has a film thickness of at most 25 nm.

Here, the recording layer of the optical recording medium is preferably a phase change recording layer.

Further, the phase change recording layer preferably has a composition represented by the formula $Ge_xTe_{1-x}$ ($0.4 \leq x \leq 0.5$) as the main component.

Further, the wavelength of recording/reproducing laser light is preferably at most 450 nm.

Advantageous Effects of Invention

According to the present invention, it is possible to obtain an optical recording medium which is a multilayer type optical recording medium wherein a recording/reproducing functional layer other than the outermost recording/reproducing functional layer from laser light incidence side, is excellent in the uniformity of the reflectivity, the durability, the signal intensity, etc.

DESCRIPTION OF EMBODIMENTS

Now, the mode for carrying out the present invention will be described with reference to a rewritable Blu-ray disc which is an optical recording medium having a large capacity, however, the present invention is by no means restricted to the following mode for carrying out the invention, and the present invention can be carried out in various forms within the range of the object of the present invention.

The present invention relates to an optical recording medium having a translucent recording/reproducing functional layer which comprises at least a first protective layer, a second protective layer, a recording layer, a third protective layer, a reflective layer and a fourth protective layer in this order from the incidence side of laser light. The optical recording medium of the present invention has at least one translucent recording/reproducing functional layer of the present invention as the outermost recording/reproducing functional layer and/or a transmission recording/reproducing functional layer. The optical recording medium of the present invention may have plural recording/reproducing functional layers of the present invention, and even through it is a multilayer type optical recording medium, the excellent recording/reproducing properties can be obtained.

Since it is required to make laser light transmit through the recording/reproducing functional layer of the present invention at a certain ratio, each layer constructing the transmission recording/reproducing functional layer is made of a material having a high transmittance, or the film thickness is controlled.

For example, the second protective layer and the fourth protective layer in the optical recording medium of the present invention are made of a material having the same constituting elements, and they are preferably made of a material containing ZnS. ZnS has a high refractive index, is transparent and has a high film formation rate, and ZnS is thereby preferred as a material for the protective layer. However, a dielectric such as ZnS is likely to be inferior in the film thickness uniformity. Therefore, while the refractive index is high, and the reflectivity can be easily controlled, the reflectivity, etc. become non-uniform due to the difference in the film thickness in the optical recording medium, and the recording/reproducing properties may deteriorate.

In the present invention, the above mentioned effects of the present invention can be obtained by improving the layer structure at the time of forming the protective layers. Specifically, the second protective layer and the fourth protective layer are made of a material having the same constituting elements, and the protective layers are formed so that when the film thickness of the second protective layer is set as D2, the film thickness of the fourth protective layer is set as D4, and the reflectivity before recording when the laser light is focused on the recording layer is set as R, the positive and the negative of increasing rates $d(R)/d(D2)$ and $d(R)/d(D4)$ relative to the film thickness of R are inverse. That is, this means that when the film thickness D2 of the second protective layer is set in such a region that the increasing rate of R relative to D2: $d(R)/d(D2)$ is positive, i.e. as D2 increases, R increases, the film thickness D4 of the fourth protective layer is set in such a region that the increasing rate of R relative to D4: $d(R)/d(D4)$ is negative, i.e. as D4 increases, R decreases. Naturally, this means that when the film thickness D2 of the second protective layer is set in such a region that the increasing rate of R relative to D2: $d(R)/d(D2)$ is negative, i.e. as D2 increases, R decreases, the film thickness D4 of the fourth protective layer is set in such a region that the increasing rate of R relative to D4: $d(R)/d(D4)$ is positive, i.e. as D4 increases, R increases.

Now, each layer of the recording/reproducing functional layer of the present invention will be explained, and the structure of the optical recording medium of the present invention will be explained.

Further, in the present invention, "main component" means a component contained in a proportion of more than 50 mol % based on the total amount of the object.

[1. The Structure of the Recording/Reproducing Functional Layer of the Present Invention]

In general, a transmission recording/reproducing functional layers is a translucent recording/reproducing functional layer and has the structure such that at least a second protective layer, a recording layer, a third protective layer, a reflective layer and a fourth protective layer are formed in this order from the incidence side of laser light. In the case of the recording/reproducing functional layer of the present invention, a first protective layer is formed at the laser light incidence side outer than the second protective layer.

Here, in the present invention, "translucent recording/reproducing functional layer" means a recording/reproducing functional layer solely having a transmittance of at least 30% of laser light to be used for recording and reproducing. The recording/reproducing functional layers other than the outermost recording/reproducing functional layer are usually required to be a translucent.

In the translucent recording/reproducing functional layer, the higher the transmittance is, the more preferred. However, in order to satisfy the recording/reproducing properties such as the reflectivity, the upper limit of the transmittance is thereby restricted at a certain level. In a case of having two recording/reproducing functional layers, the transmittance of the translucent recording/reproducing functional layer at the laser light incidence side is preferably at least 40%, more preferably at least 45%, and preferably at most 60%, more preferably at most 55%.

In the case of the translucent recording/reproducing functional layer, as mentioned above, the desired transmittance and reflectivity must be realized by controlling materials or thickness of each layer constructing the recording/reproducing functional layer. However, as mentioned above, the range of controlling the film thickness of the recording layer, the third protective layer and the reflective layer is narrow, and thereby the transmittance and the reflectivity of the recording/reproducing functional layer is generally controlled by the second protective layer and the fourth protective layer.

Considering the transmittance of the recording/reproducing functional layer, with respect to materials for the second protective layer and the fourth protective layer, the second protective layer and the fourth protective layer are preferably formed so as to be thin by using a material having a high transparency. Further, considering the reflectivity of the recording/reproducing functional layer, the second protective layer and the fourth protective layer are preferably made of a material having a higher refractive index than adjacent layers. The higher the difference is, the more the reflectivity can be controlled by the interference effect by controlling the thickness or the like. Further, considering the productivity of optical recording media, a material having a high film formation rate is preferred. Further, in order to obtain the after-mentioned effect, the second protective layer and the fourth protective layer are required to be made of a material having the same constituting elements. Particularly, the content of each constituting element is also preferably the same. By selecting such a material, the second protective layer and the fourth protective layer have the same film thickness distribution at a time of forming protective layers, whereby the effect of the present invention can be obtained.

Further, the refractive index of each layer is evaluated by preparing a single layer film made of the material of each layer and measuring a refractive index by using a known ellipsometer (for example, MEL-30S, manufactured by JASCO Corporation).

That is, the second protective layer and the fourth protective layer are made of a material having the same constituting elements, preferably a material containing ZnS, further preferably a material containing ZnS as the main component. However, in the case of the material containing ZnS, the uniformity in thickness of the film thereby obtained tends to be low.

(Influence of Ununiformity of the Film Thickness on the Properties of the Recording/Reproducing Functional Layer)

In a case where the uniformity in the film thickness of protective layers to be formed is low, and there is a difference in the film thickness at some parts, the uniformity in the reflectivity of the recording/reproducing functional layer is also thereby influenced. The reflectivity of the recording/reproducing functional layer substantially depends on a material of the reflective layer. However, at an interface between layers having different refractive indices, transmitted light and reflected light are generated, and they interfere each other, to present an influence over the entire reflectivity. That is, the difference in the film thickness becomes the difference in optical paths of laser light in the optical recording medium, and the degree of the interference is thereby influenced. Thus, in a case where the uniformity in the film thickness is lowered, and the uniformity in the reflectivity in the recording/reproducing functional layer is thereby lowered, the recording/reproducing properties will be deteriorated. Therefore, in order to obtain excellent recording/reproducing properties, it is conceivable to improve the uniformity in the film thickness.

(Approach to Improve the Uniformity in the Film Thickness)

As the method for improving the uniformity in the film thickness, for example, the method of making the film thickness thin can be considered. When the film thickness is thin, the difference in the film thickness between a part where the film thickness is thick and a part where the film thickness is thin is small, and the difference in optical paths is also small. If the film thickness is too thick, production cost of optical recording media is expensive, and therefore the film thicknesses is preferably thin.

On the other hand, at a time of forming a layer, the film formation is usually carried out by rotating a substrate or a magnet for sputtering in order to make the film thickness distribution in the circumferential direction uniform, and therefore it is necessary to take time for the film formation sufficiently longer than a rotational cycle. However, if the film thicknesses is too thin, the time for forming the film becomes too short, and the film thickness tends to be non-uniform. Therefore, it is difficult to improve the uniformity in the film thickness by simply making the film thickness thin.

Since the film thicknesses of the second protective layer and the fourth protective layer are basically important from the viewpoint of obtaining the desired reflectivity by using the interference effect, it is difficult to make the second protective layer and the fourth protective layer extremely thin.

The uniformity in the sputtered film thickness is influenced by the material for the layer, the construction of sputtering apparatus for forming the film or conditions for forming the film. For example, from the viewpoint of the material for the layer, a material containing ZnS is preferred for the protective layer of the present invention. However, while such a material has many merits from the viewpoint of the transmittance and the reflectivity as mentioned above, the uniformity in thickness of the film to be formed tends to be low. Further, the uniformity in the film thickness of the layer is influenced by a hardware such as the structure or shape of the sputtering target or sputtering chamber of the sputtering apparatus for forming the film or the magnet construction or by film forming conditions such as film formation power or film formation time. Thus, it is ideal to design the apparatus depending on the material or film-forming conditions to be used, however, it is impractical to design such apparatus in many cases. Not limited to the material containing ZnS, the problem of ununiformity of a layer always occurs in greater or lesser degrees.

Here, the film thickness distribution of a layer formed is discussed. The film thickness distribution by no means becomes random every time when a layer is formed. When the above mentioned conditions are unified, namely, if the film formation is carried out with the same material for a layer by the same apparatus under the same film forming conditions, a layer having a similar film thickness distribution tends to be always formed, except for the influence of the deterioration of the apparatus with time.

For example, in a case where the same material and the same apparatus are used under the same conditions, even though the thickness of a layer to be formed is changed, the film thickness distribution tends to be similar. That is, in a region where the thickness of a film tends to be thinner than the desired film thickness, the film thickness tends to be thin similarly every time when a layer is formed. On the other hand, in a region where the film thickness tends to be thicker than the desired film thickness, the film thickness tends to be thick similarly every time when a layer is formed.

Thus, in a case where plural layers of the same material are formed in the recording/reproducing functional layer by using the same apparatus, the change in the film thickness in each layer tends to be similar, and all layers tend to be thick in a region where the film thickness tends to be thick, and all layers tend to be thin in a region where the film thickness tends to be thin, whereby the uniformity of the film thickness tends to be further lowed.

Thus, the formation of the distribution of the film thickness of formed layers cannot be avoided, and the recording property of the recording/reproducing functional layer thereby tends to be low.

Particularly, as mentioned above, in the case of the transmission recording/reproducing functional layer, the range of controlling the film thickness of each layer is narrow in order to obtain a high transmittance. In addition, if the uniformity in the film thickness is lowered by the restriction of the performance of the sputtering apparatus, it tends to be particularly difficult to control the recording/reproducing properties.
(Approach to Make the Positive and Negative of the Changing Rates of the Reflectivity Inverse)

As a method for improving the uniformity of the reflectivity in the recording/reproducing functional layer, a method of forming a structure is considered such that when the whole recording/reproducing functional layer is observed as one layer, the change in the reflectivity of the whole recording/reproducing functional layer is small, whereby the reflectivity becomes uniform, even though there is a difference in the thickness of each layer constructing the recording/reproducing functional layer.

In general, due to the interference effect, the reflectivity relative to the film thickness of a transparent material periodically changes. Therefore, by selecting the film thickness in the vicinity of the minimum value or the maximum value of the reflectivity, the change in the reflectivity relative to the change in the film thickness can be lowered. However, as mentioned above, since the thickness of each layer constructing the recoding/reproducing functional layer cannot be selected only by considering the reflectivity, the film thickness in the vicinity of the minimum value or the maximum value cannot be always selected. Since the range of controlling the recording layer, the third protective layer and the reflective layer or the like is narrow as mentioned above, many properties including the reflectivity are controlled by the second protective layer and the fourth protective layer, and accordingly it is clearly difficult to control the thicknesses of the second protective layer and the fourth protective layer so as to be in the vicinity of such an extreme value.

That is why, the present inventors have found that in a case where the periodic change in the reflectivity relative to the film thickness of a transparent material is taken into consideration, the second protective layer and the fourth protective layer are constructed so as to have the film thicknesses such that the increase and the decrease of the reflectivity relative to the change in the film thickness become inverse, whereby the uniformity of the reflectivity can be improved. Specifically, the second protective layer is constructed so as to have a film thickness in the vicinity of a region where the thicker the second protective layer is, the lower the reflectivity is, and the fourth protective layer is constructed so as to have a film thickness in the vicinity of a region where the thicker the film thickness of the fourth protective layer is, the higher the reflectivity is; or the second protective layer is constructed so as to have a film thickness in the vicinity of a region where the thicker the film thickness of the second protective layer is, the higher the reflectivity is, and the fourth protective layer is constructed so as to have a film thickness in the vicinity of a region where the thicker the film thickness of the fourth protective layer is, the lower the reflectivity is.

Since both the second protective layer and the fourth protective layer are made of a material having the same constituting elements, the film thickness distributions tend to be similar. Accordingly, by controlling the film thicknesses such that the increase and the decrease of the reflectivity relative to the change in the film thickness are inverse, even though the uniformity of the film thickness of each layer is low, the change in the reflectivity is offset, and when the whole recording/reproducing functional layer is observed as one layer, more uniform reflectivity distribution can be obtained.

Specifically, for example, in a case where the recording/reproducing functional layer is constructed such that the second protective layer is formed so as to have a film thickness in the vicinity of a region where the thicker the film thickness is, the lower the reflectivity is, and the fourth protective layer is formed so as to have a film thickness in the vicinity of a region where the thicker the film thickness is, the higher the reflectivity is, in a region where the second protective layer tends to be thin, the fourth protective layer also tends to be thin, however, even though the reflectivity of the second protective layer is lowered, the reflectivity of the fourth protective layer becomes high, whereby when the whole recording/reproducing layer is observed as one layer, more uniform reflectivity can be obtained.
(First Protective Layer)

In the optical recording medium of the present invention, by controlling the second protective layer and the fourth protective layer in a translucent recording/reproducing functional layer other than the outermost recording/reproducing functional layer, the recording/reproducing properties can be improved. However, in a case where a conventional phase change recording layer is used, the changing rate of the reflectivity in the film thickness of the second protective layer and the changing rate of the reflectivity in the film thickness of the fourth protective layer are usually not inverse. This reason will be explained below.

More specifically, in a case where the after mentioned phase change material is used as a recording layer, under a state of controlling the recording/reproducing properties, usually used is a region where when the film thickness of the fourth protective layer is made to be thick, the reflectivity becomes high. In a case of a material containing ZnS which is a preferred material as the second protective layer, when the film thickness is increased from 0 nm, at first the reflectivity lowers, and after passing the minimum value, the reflectivity tends to be high. Thus, if the present invention is tried to be applied, the film thickness of the second protective layer has to be within a range where the film thickness is thinner than the minimum value.

However, since the protective layer has a role of physically and chemically protecting a recording/reproducing functional layer, if the second protective layer is made to be extremely thin as mentioned above, the durability of the recording/reproducing functional layer deteriorates. Further, if the second protective layer is made to be thin, signal amplitude tends to be small. Thus, in a case of conventional optical recording media, the film thickness of the second protective layer is usually set to be thicker than a film thickness at which the reflectivity takes the minimum value.

That is, if the film thickness of the second protective layer is designed to be thinner than the first minimum value of the reflectivity when the film thickness is increased from 0 nm, the film thickness of the second protective layer becomes thinner than usual, and the protective function tends to deteriorate. This tendency may affect the protective function such as the storage durability under severe conditions. Further, in the case of rewritable or recordable optical recording media, the tendency is particularly remarkable.

It is considered that the deterioration of the protective function due to the film thickness of the second protective layer being thin, is caused because heat damage of other layers which contact to the second protective layer becomes high, or the deterioration due to gas penetration progresses.

Therefore, in the present invention, the first protective layer having a lower refractive index than the second protective layer is formed additionally on the laser incidence side of the second protective layer, and the film thickness of each layer is controlled, whereby the recording/reproducing functional layer can be protected.

Since the first protective layer is required to have an optically different quality from the second protective layer, the refractive index of the second protective layer has to be higher by at least 0.3 than the refractive index of the first protective layer. Because, if the refractive index of the first protective layer is a value close to the second protective layer, the first protective layer cannot be optically distinguished from the second protective layer, and the influence to the reflectivity is not decided by the film thickness of the second protective layer solely, but decided by the total film thickness of the second protective layer and the first protective layer.

Figure 1:
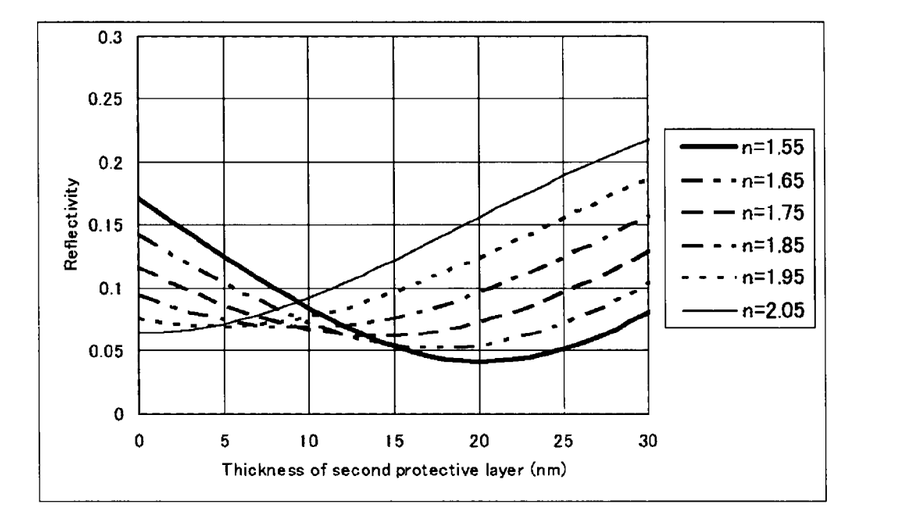
FIG. 1 shows a result of calculation of the relationship between the second protective layer and the reflectivity, when the refractive index of the first protective layer is changed in the optical recording medium structure of the present invention.

FIG. 1 shows a result of calculation by computer simulation how the reflectivity before recording is changed in an optical recording medium having a translucent recording/reproducing functional layer which comprises at least a first protective layer, a second protective layer, a recording layer, a third protective layer, a reflective layer and a fourth protective layer in this order from the incidence side of laser light, when the film thickness of the second protective layer is changed relative to the first protective layer having a predetermined film thickness, based on designed values of the respective layers of an optical recording medium which has recording/reproducing properties at a certain level, and laser light is focused on the recording layer. The specific thicknesses and complex refractive indices of the respective layers are shown in the following Table 1. The complex refractive index at a part (UV curable resin or the like) which contacts to the first protective layer and the fourth protective layer was set as 1.5-Oi. Further, interference layers were constructed such that, $Cr_2O_3$—$Ta_2O_5$ was formed between the fourth protective layer and the reflective layer, and $ZrO_2$—$Cr_2O_3$ was formed between the recording layer and the second protective layer.

TABLE 1

| | Fourth protective layer | CrTaO | Reflective layer AgCuNd | Third protective layer | Recording layer BiGeTe | ZrCrO | Second protective layer | First protective layer |
|---|---|---|---|---|---|---|---|---|
| Film thickness [nm] | 30 | 3 | 11 | 8 | 5 | 5 | as shown in FIG. 1 | 30 |
| Complex refractive index | 2.3-Oi | 2.2-Oi | 0.1-2i | 2.2-Oi | 1.4-2.8i | 2.2-Oi | 2.3-Oi | n-Oi |

As the second protective layer and the fourth protective layer, $(ZnS)_{80}(SiO2)_{20}$ is assumed. Here, when the film thickness of the fourth protective layer is set as D4, and the reflectivity before recording when the laser light is focused on the recording layer is set as R, the increasing rate of d(R)/d(D4) relative to the film thickness of R is positive. Accordingly, in order to bring the construction within the scope of the optical recording medium of present invention, when the film thickness of the second protective layer is set as D2, the increasing rate d(R)/d(D2) relative to the film thickness of R has to fall within the range of negative.

It is evident from FIG. 1 that as the refractive index (n) of the first protective layer becomes lower, the upper limit of the region where the change in the reflectivity relative to the change in the film thickness of the second protective layer tends to be negative, i.e. the region where d(R)/d(D2) tends to be negative, increases, whereby the region of the film thickness of the second protective layer which can realize the present invention becomes broad, and an optical recording medium can be easily designed from the viewpoint of the uniformity of the reflectivity.

Further, if the refractive index of the first protective layer is similar to that of the second protective layer, the change in the reflectivity becomes optically similar to the change in the reflectivity in a case where the second protective layer becomes thick, whereby the significance of controlling the film thickness of the second layer decreases.

That is why, the refractive index of the first protective layer is preferably smaller by at least 0.3 than that of the second protective layer.

Specifically, in a case where the second protective layer contains ZnS, the second protective layer usually has a refractive index of more than 2.0 with the recording/reproducing laser light (usually, wavelength: about 405 nm), and accordingly the first protective layer should preferably have a refractive index of at most 1.90, more preferably at most 1.80, particularly preferably at most 1.75, further preferably at most 1.70 at the wavelength of the recording/reproducing laser light.

Including a case where the material of the second protective layer is a material other than the material containing ZnS, from the viewpoint of the difference in the refractive index between the second protective layer and the first protective layer, the refractive index of the second protective layer is preferably higher by at least 0.3, further preferably higher by at least 0.5, particularly preferably higher by at least 0.6, than that of the first protective layer.

On the other hand, if the refractive index of the first protective layer is too low, the signal amplitude tends to be small in a region where the positive and the negative of the changing rates of the reflectivity of the fourth protective layer and the second protective layer are inverse.

In such a case, by adjusting the reflective layer to be thick and the recording layer to be thin, the transmittance and the signal amplitude can be both established. However, if the recording layer becomes too thin, the crystallization rate for rewriting becomes slow, and the recording/reproducing properties tend to deteriorate. Therefore, if the refractive index of the first protective layer is too low, the recording and the reproducing are substantially restricted to a region where the signal amplitude is small. Therefore, the refractive index of the first protective layer is preferably at least 1.30, more preferably at least 1.50, particularly preferably at least 1.60.

(Outermost Recording/Reproducing Functional Layer)

As mentioned above, in the present invention, in a case where the recording/reproducing functional layer is a transmission recording/reproducing functional layer, it is preferred that while securing the transmittance by making the film thickness of each layer constructing the recording/reproducing functional layer thin, the film thicknesses are designed so that the positive and the negative of the changing rates of the reflectivity of the second protective layer and the fourth protective layer become inverse in a region where the film thicknesses of the layers are thin as far as possible in order to solve the non-uniformity in the reflectivity due to the non-uniformity of the film thickness.

However, in the outermost recording/reproducing functional layer, it is not necessary to consider the transmittance as compared to the transmission recording/reproducing functional layer, the film thicknesses of the second protective layer and the third protective layer can be relatively freely designed, and the serious problem about the uniformity of the reflectivity tends not to result. Further, the third protective layer is formed thick in many cases in order to adjust the heat release property, which is preferred to offset the change in the reflectivity between the second protective layer and the third protective layer.

Thus, even though the recording/reproducing functional layer of the present invention is not employed as the outermost recording/reproducing functional layer, the effect of the present invention can be obtained by employing the recording/reproducing functional layer of the present invention as a transmission recording/reproducing functional layer. Needless to say, the recording/reproducing functional layer of the present invention may be employed as the outermost recording/reproducing functional layer.

Further, the outermost recording/reproducing functional layer may not have a fourth protective layer. Further, even if the outermost recording/reproducing functional layer has a fourth protective layer, in a case where the reflective layer is thick, and the reflectivity is high, it does not contribute to optical design.

(Film Thicknesses of the Respective Layers Constructing the Recording/Reproducing Functional Layer)

Since the relationship between the film thicknesses of the respective layers and the recording/reproducing properties is influenced by many factors as mentioned above, the film thicknesses of the respective layers are preferably within the following ranges.

The first protective layer is preferably at least 12 nm, more preferably at least 15 nm and preferably at most 40 nm, more preferably at most 30 nm.

Within the above range, it is possible to well maintain the rewriting durability, while maintaining the reflectivity, the uniformity of the reflectivity and the signal amplitude property. Further, in the case of the second protective layer containing ZnS, by adjusting the film thickness of the first protective layer within the above range, the film thickness value of the second protective layer when the reflectivity takes the minimum value to the change of the film thickness of the second protective layer, becomes an appropriate value, and the range of the film thickness where the positive and the negative of d(R)/d(D2) and d(R)/d(D4) are inverse, thereby becomes broad, and the rewriting durability can also be well maintained.

The second protective layer is preferably at least 8 nm, more preferably at least 10 nm and preferably at most 25 nm, more preferably at most 20 nm.

Within the above range, the uniformity of the reflectivity can be well maintained, while maintaining the reflectivity, the signal amplitude, and the rewritable durability.

The recording layer is preferably at least 3 nm, more preferably at least 4 nm and preferably at most 10 nm, more preferably at most 8 nm.

Within the above range, the crystallization rate and the signal intensity can be well maintained, while maintaining the reflectivity.

The third protective layer is preferably at least 2 nm, more preferably at least 5 nm and preferably at most 20 nm, more preferably at most 15 nm.

Within the above range, the heat release property of the recording layer is excellent, and the signal intensity can be maintained.

The reflective layer is preferably at least 5 nm, more preferably at least 7 nm and preferably at most 20 nm, more preferably at most 15 nm.

Within the above range, the signal intensity can be maintained, while maintaining the transmittance.

The fourth protective layer is preferably at least 5 nm, more preferably at least 10 nm, further preferably at least 15 nm and preferably at most 50 nm, more preferably 40 nm and further preferably at most 35 nm.

Within the above range, the reflectivity, the transmittance, the uniformity of the reflectivity and the signal amplitude can be well maintained.

Here, in order to secure the uniformity of a high reflectivity even though the recording/reproducing functional layer of the present invention has non-uniformity of the film thickness, it is preferred that as mentioned above, the tendency of the film thickness distribution of the second protective layer and the fourth protective layer is made to be similar by using a material having the same constituting elements for the second protective layer and the fourth protective layer, and the refractive index of the first protective layer is made to be within the above range, whereby the uniformity of the reflectivity can be easily controlled by adjusting the film thicknesses of the respective layers constructing the recording/reproducing functional layer. By adjusting the film thicknesses of the respective layers constructing the recording/reproducing functional layer to be within the above ranges under such conditions, it is possible to obtain a recording/reproducing functional layer having a uniform reflectivity.

Particularly, the optical recording medium having the effect of the present invention is preferably an optical recording medium having a translucent recording/reproducing functional layer which comprises at least a first protect layer, a second protective layer, a recording layer, a third protective layer, a reflective layer and a fourth protective layer in this order from the incidence side of laser light, wherein the second protective layer and the fourth protective layer are made of a material containing ZnS and having the same constituting elements, the first protective layer has a film thickness of at least 15 nm and a refractive index of from 1.30 to 1.80 at the wavelength of recording/reproducing laser light, and the second protective layer has a film thickness of at most 16 nm.

[2. Components of Each Layer Constructing the Recording/Reproducing Functional Layer of the Present Invention]

(2-1. Components of the Second and the Fourth Protective Layers)

The second protective layer and the fourth protective layer are made of the same constituting elements, and preferably contain ZnS, particularly preferably contain ZnS as the main component.

In addition to ZnS, as another component to be contained, an oxide of Sc, Y, Ce, La, Ti, Zr, Hf, V, Nb, Ta, Zn, Al, Cr, In, Si, Sn, Ge or the like; a nitride of Ti, Zr, Hf, V, Nb, Ta, Cr, Mo, W, Zn, B, Al, Si, Ge, Sn or the like; a carbide of Ti, Zr, Hf, V, Nb, Ta, Cr, Mo, W, Si, or the like, a sulfide, a selenide or a telluride of Y, Cd, Ga, In, Si, Ge, Sn, Pb, Sb, Bi or the like; an oxysulfide of Y, Ce or the like; or a fluoride of Mg, Ca or the like may, for example, be mentioned. Such another component may be contained alone, or at least two such components may be contained in an optional combination at an optional ratio.

Particularly, as a material for the second protective layer and the fourth protective layer, $(ZnS)_{80}(SiO_2)_{20}$ is particularly preferred from the viewpoint of the rewriting durability, the transmittance and the film formation rate.

(2-2. Components of the First Protective Layer)

Since the difference in the refractive index between the second protective layer and the first protective layer is at least 0.3, and the second protective layer is usually made of a dielectric having a relatively high refractive index, the first protective layer preferably has a lower refractive index than the second protective layer. Since ZnS which is a preferred material for the second protective layer is a material having a relatively high refractive index, a material is substantially selected mainly from materials having a low refractive index so that while sufficiently maintaining the protective function, the positive and the negative of the changing rates of the reflectivity relative to the film thickness of the second protective layer can be changed.

Specifically, a material containing an oxide or nitride of Si, Al or the like as the main component is preferred, and the oxide and nitride are preferably mixed in order to obtain the optimum refractive index.

As a specific example, an oxide of Sc, Y, Ce, La, Ti, Zr, Hf, V, Nb, Ta, Zn, Al, Cr, In, Si, Sn, Ge or the like; a nitride of Ti, Zr, Hf, V, Nb, Ta, Cr, Mo, W, Zn, B, Al, Si, Ge, Sn or the like; a carbide of Ti, Zr, Hf, V, Nb, Ta, Cr, Mo, W, Si, or the like, a sulfide, a selenide or a telluride of Zn, Y, Cd, Ga, In, Si, Ge, Sn, Pb, Sb, Bi or the like; an oxysulfide of Y, Ce or the like; or a fluoride of Mg, Ca or the like may, for example, be mentioned. Such another component may be contained alone, or at least two such components may be contained in an optional combination at an optional ratio.

Among them, as a material for the first protective layer, Si—O—N is particularly preferred from the viewpoint of the rewriting durability and the transmittance. The compositional ratio of Si—O—N is preferably within the range of $0 \leq x \leq 0.4$, $0 \leq y \leq 0.6$ and $0 < z < 1$, when represented by $(SiO_{(2-x)})_z(Si_3N_{(4-y)})_{(1-z)}$.

(2-3. Components of the Third Protective Layer)

As a material for the third protective layer, an oxide of Sc, Y, Ce, La, Ti, Zr, Hf, V, Nb, Ta, Zn, Al, Cr, In, Si, Sn, Ge or the like; a nitride of Ti, Zr, Hf, V, Nb, Ta, Cr, Mo, W, Zn, B, Al, Si, Ge, Sn or the like; a carbide of Ti, Zr, Hf, V, Nb, Ta, Cr, Mo, W, Si or the like; a sulfide, a selenide or a telluride of Zn, Y, Cd, Ga, In, Si, Ge, Sn, Pb, Sb, Bi or the like; an oxysulfide of Y, Ce or the like; or a fluoride of Mg, Ca or the like, or a mixture thereof may, for example, be mentioned. They may be used alone, or at least two of them may be used in an optional combination at an optional ratio.

(2-4. Component of the Recording Layer)

The present invention is preferably employed for rewritable optical recording media having a phase change recording layer which is required to have a high rewriting durability, and also employed for recordable optical recording media having a recording layer mainly made of a nitride or oxide of a metal or semiconductor.

(Phase Change Recording Layer)

As a material for the phase change recording layer, a chalcogen alloy is used in many cases, however, as a material for a rewritable phase change recording layer used in the transmission recording/reproducing functional layer, a Ge—Te type recording material, for example, a material having a composition in the vicinity of $Ge_{50}Te_{50}$ as the main component is preferred. Particularly, a material having the composition represented by $Ge_xTe_{1-x}$ ($0.4 \leq x \leq 0.5$) as the main component is preferred.

The change in the complex refractive index of the above material between a crystal state and an amorphous state is large, and even in a case where the film thickness of the recording layer is made to be thin, a relatively strong signal intensity can be obtained. Further, even in a case where the reflective layer is made to be thin, namely in a case where the heat release effect is low, a relatively excellent rewriting property can be easily obtained.

One of the above factors is considered to be that, for example the rate of forming crystal nucleus is high, as compared to phase change materials having $Sb_xTe_{1-x}$ ($0.7 \leq x \leq 0.9$) as the main component. The Ge—Te recording material is likely to have a low crystallization rate and in order to increase the crystallization rate, it is preferred to incorporate from 3 to 15 atomic %, more preferably from 3 to 10 atomic %, of Bi, Sn or the like. Further, in order to improve the stability in an amorphous state, it is preferred to incorporate from 2 to 10 atomic %, more preferably from 2 to 6 atomic %, of In.

Since the crystal nucleus formation rate of the above material is significantly influenced by a material which contacts to a recording layer, a material containing $Ta_2O_5$, $ZrO_2$, $HfO_2$, $Cr_2O_3$ or the like, or a mixture thereof, which increases the crystal nucleus formation rate, is preferably provided as an interface layer in contact with the recording layer.

(Recording Layer in Recordable Optical Recording Medium Comprising a Nitride or Oxide of a Metal or Semiconductor)

A recording layer in a recordable optical recording medium comprising a nitride or oxide of a metal or semiconductor preferably contains substance A which is decomposed at a temperature which the recording layer reaches by heat at a time of recording and substance B which is free from chemical reaction or phase change at a temperature which the recording layer reaches by heat at a time of recording.

The substance A is preferably a nitride of a metal or a nitride of a semiconductor which has a decomposition temperature at a level of at most the temperature which the recording layer reaches by heat at a time of recording (for example 1,200° C.). Such a nitride may, for example, be a nitride of one element selected from the group consisting of Cr, Mo, W, Fe, Ge, Sn and Sb. Such a nitride may be used alone, or at least two nitrides may be used in combination at an optional ratio.

Among them, from the viewpoint of the stability and low noise after recording, nitrides of Mo, Ge, Sn and Sb are preferred, and nitrides of Sn and Sb are particularly preferred.

Further, as the substance A, an oxide of a metal or an oxide of a semiconductor having a decomposition temperature at a level of at most the temperature which the recording layer reaches by heat at a time of recording (for example 1,200° C.) may, for example, be mentioned. Such an oxide is preferably an oxide of at least one element selected from the group consisting of Ir, Au, Ag and Pt. Such an oxide may be used alone, or at least two oxides may be used in combination of at an optional ratio.

Among them, oxides of Au, Ag and Pt are preferred from the viewpoint of the stability and low noise after recording.

Such a nitride of a metal, a nitride of a semiconductor, an oxide of a metal or an oxide of a semiconductor releases nitrogen or oxygen at a temperature which the recording layer reaches at a time of recording and is decomposed into a simple metal or a simple semiconductor.

On the other hand, as the substance B, a nitride of a metal or a nitride of a semiconductor which is free from chemical reactions or phase change at a temperature which the recording layer reaches by heat at a time of recording (preferably does not have the decomposition temperature or a melting point at a level of at most 1,500° C.) is preferably used. Such a nitride may, for example, be a nitride of at least one element selected from the group consisting of Ti, Zr, Hf, V, Nb, Ta, Al and Si. Such a nitride may be used alone, or at least two such nitrides may be used in combination at an optional ratio.

Among them, nitrides of Ti, V, Nb, Ta, Al and Si are preferred from the viewpoint of high stability and low cost, and nitrides of Ti, V, Nb, Ta and Si are particularly preferred. Among them, V and Nb are particularly preferred.

Further, as the substance B, an oxide of a metal or an oxide of a semiconductor which is free from chemical reactions or phase change at a temperature which the recording layer reaches by heat at a time of recording (preferably, does not have a decomposition temperature or a melting point at a level of at most 1,500° C.) may be mentioned.

As such an oxide, an oxide of at least one element selected from the group consisting of Zn, Al, Y, Zr, Ti, Nb, Ni, Mg and Si is preferably used. Such an oxide may be used alone, or at least two such oxides may be used in combination at an optional ratio. Among them, the oxides of Zn, Al, Y, Zr, Nb and Si are particularly preferred from the viewpoint of stability and low noise after recording.

(2-5. Reflective Layer)

A material to be used for a reflective layer is preferably a material having a high reflectivity, particularly preferably a metal such as Au, Ag or Al wherein the heat release effect can be expected, and a material containing Ag as the main component is particularly excellent. An Ag alloy which contains in addition to Ag, from 0.01 to 10 atomic % of at least one rare-earth element of Mg, Ti, Au, Cu, Pd, Pt, Zn, Cr, Si, Ge, Bi and Nd is preferred, since such an alloy has a high reflectivity, a high heat conductivity and an excellent heat durability.

At an interface on the side which contacts a reflective layer containing Ag as the main component, an interface layer containing no sulfur or of which the sulfur content is low is preferably formed. In a case where sulfur is contained in a protective layer, such an interface layer is usually used to prevent a reaction of Ag with sulfur (corrosion of Ag).

[3. Method for Producing the Optical Recording Medium of the Present Invention]

The method for producing the optical recording medium of the present invention is not particularly restricted, and the optical recording medium of the present invention can be produced by conventional methods. Now, specific examples will be explained.

(Substrate)

As a substrate to be used in the optical recording medium of the present invention, a resin such as a polycarbonate, an acrylic or a polyolefin; glass; a metal such as aluminium; or the like may be used.

Since a substrate is usually provided with a guide groove having a depth of from about 15 to 250 nm, a substrate made of a resin on which a guide groove can be formed by injection molding is preferred.

The thickness of such a substrate is optionally selected depending on applications, and the thickness is usually at least 0.3 mm, preferably at least 0.5 mm and usually at most 3 mm, preferably at most 2 mm. In a case of Blu-ray discs, the thickness of the substrate is about 1.1 mm.

(Method for Forming Protective Layer, Recording Layer and Reflective Layer)

Each protective layer, a recording layer and a reflective layer can be formed by conventional methods, however, they are preferably formed by a sputtering method. In a case where a layer containing plural elements is formed, such a layer may be formed by using an alloy target or by a cosputtering method in which electric discharge is carried out from plural simple targets simultaneously. Further, in a case where a gaseous element is contained, a reactive sputtering method may be employed.

(Method for Forming Layer Other than Protective Layer, Recording Layer and Reflective Layer)

As a case requires, the optical recording medium of the present invention may be provided with another layer different from the above respective layers. For example, in a case of Blu-ray discs, a cover layer is usually formed on the laser light incidence side.

While the cover layer has a role to protect a sputter film from moisture or dust, the cover layer is required to let laser light transmit therethrough. Therefore, the cover layer is required to be transparent to laser light to be used for recording/reproducing and preferably has a thickness of from 50 μm to 150 μm. The cover layer is usually formed by applying a UV curable resin by a spin coating method, followed by curing, or by bonding a transparent sheet.

Further, between respective layers, a diffusion preventive layer for preventing mutual diffusion, or an interface layer having a function of e.g. an adhesion layer to improve an adherence property may be optionally used.

(Wavelength of Recording/Reproducing Laser)

In the optical recording medium of the present invention, the wavelength of laser to be used for recording and reproducing (recording/reproducing laser wavelength) is not particularly restricted, however, when a wavelength of particularly at most 500 nm, preferably at most 450 nm, further preferably at most 420 nm is used, high effects can be obtained. The shorter the wavelength is, the more the change in the reflectivity by the thickness of a layer is influenced. Further, the wavelength of the recording/reproducing laser is preferably at least 380 nm.

EXAMPLES

Now, the present invention will be described in further detail with reference to Examples. However, the present invention is by no means restricted to the following Examples so long as they do not depart from the scope of the present invention.

The present invention is assumed to be applied to a recording/reproducing functional layers (transmission recording/reproducing functional layers) other than the outermost recording/reproducing functional layer in an optical recording medium having a multilayer structure. An optical recording medium having two layers was prepared to evaluate the recording/reproducing properties. However, the reflectivity and the uniformity of the reflectivity were measured by preparing an optical recording medium having a single layer. Because, in the measurement of the reflectivity, the influence of other recording/reproducing functional layers can be excluded. Further, the refractive index of each layer was measured by preparing a single layer film made of a material of each layer.

[Evaluation Method]

<Evaluation of the Recording/Reproducing Properties>

The recording/reproducing properties were evaluated by measuring a jitter value after over-writing as the rewriting durability. As the jitter values, jitter (DOW10) after 10 times over-writing and jitter (DOW1000) after 1,000 times of over-writing were respectively measured.

ODU1000 tester (for Blu-ray discs, wavelength: about 406 nm, NA=0.85) manufactured by Pulstec Industrial Co., Ltd.

was used. The recording property was evaluated with a linear velocity of 9.83 m/s (2× speed) by driving focus servo and tracking servo in a groove. Over-writing with signal using 1-7PP recording technique was carried out. The clock frequency was in proportion to the linear velocity at a time of recording, based on the standard clock frequency of 66 MHz at 1× speed of Blu-ray disc.

Jitter was measured by converting recording signal into waveform by a limit equalizer, followed by binarization, and the distribution of the time difference between the rising edge and the falling edge of the binarized signal, and the rising edge and the falling edge of the periodic signal was measured by a time interval analyzer (data to clock jitter). All pulse waveforms were made to be the same form in the optical recording medium by using a recording power of 12.8 mW at a time of measuring jitter, a deleting power of 3.5 mW and division pulse. The division pulse waveform was divided into n−1 pulses having a recording power in a case of recording a mark having a length of nT, where the standard clock period was T, and the division pulse length was (6/16) T. The division pulse interval was overwritten with a power of 0.1 mW, and a part corresponding to an interval of recorded marks was irradiated with a deleting power and over-written.

Further, with respect to only the recording/reproducing functional layer at the laser light incidence side of a two layer-optical recording medium, jitter evaluation was carried out. Between a cover sheet used for producing a one layer-optical recording medium and an UV curing resin used for producing a two layer-optical recording medium, the rewriting durability, namely jitter value after 1,000 time over-writing (DOW1000) changes. Further, the rewriting durability of the UV curing resin is superior.

<Reflectivity>

The reflectivity of a single layer-optical recording medium before laminating two layers was measured. By using ODU1000 tester, manufactured by Pulstec Industrial Co., Ltd. (for Blu-ray discs, wavelength: about 406 nm, NA=0.85), reproducing waveform with a reproducing power of 0.7 mW and a linear velocity of 4.92 m/s was observed by an oscilloscope, and an average of one round was measured. A measuring position was set at a radius of 29 mm from the center of the optical recording medium.

<Uniformity of the Reflectivity>

The uniformity of the reflectivity of a single layer-optical recording medium before laminating a second layer was measured.

First, each average reflectivity at a position of radius 24 mm, 40 mm, 55 mm, 57 mm and 58 mm from the center of the optical recording medium was measured, the maximum reflectivity was set as Rh, and the minimum reflectivity was set as Rl. The uniformity of the reflectivity was measured as a value of (Rh−Rl)/Rh. The reflectivity at each radius position was measured by using ODU1000 tester, manufactured by Pulstec Industrial Co., Ltd. (for Blu-ray disc, wavelength: about 406 nm, NA=0.85), by observing a reproducing waveform with a reproducing power of 0.7 mW and a linear velocity of 4.92 m/s by an oscilloscope, and measuring an average of one round.

<Refractive Index>

The refractive index was measured by an ellipsometer MEL-30S, manufactured by JASCO Corporation.

Examples 1 to 5 and Comparative Examples 1 to 3

Preparation of an Optical Recording Medium

Among respective optical recording media in Examples 1 to 5 and Comparative Examples 1 to 3, the layer structure of one layer is different as shown in Table 2, however, the production method is common. Now, they will be explained together.

<Preparation of a Single Layer Optical Recording Medium>

First, a translucent recording/reproducing layer for the laser light incidence side was solely formed directly on a substrate having a groove and a thickness of 1.1 mm. Then, a transparent sheet having a thickness of 100 μm was bonded as a cover layer to prepare a single layer-optical recording medium.

After initial crystallization, the reflectivity and the uniformity of the reflectivity of the recording/reproducing functional layer at the incidence side in a single layer structure state were evaluated.

A sputtering film of a translucent recording/reproducing functional layer at the laser light incidence side has a structure that from the substrate side, a fourth protective layer $((ZnS)_{80}(SiO_2)_{20}$, a $Cr_2O_3$—$Ta_2O_5$ interface layer (3 nm), an Ag alloy reflective layer, a third protective layer ($Cr_2O_3$—$Ta_2O_5$ (8 nm)), a Bi—Ge—Te recording layer, a $ZrO_2$—$Cr_2O_3$ interface layer (5 nm), a second protective layer $((ZnS)_{80}(SiO_2)_{20})$ and a first protective layer (Si—O—N). Further, the first protective layer side is irradiated with the laser light.

(First Protective Layer)

An Si—O—N layer of the first protective layer was prepared by while supplying 4 sccm of $O_2$ gas and 36 sccm of $N_2$ gas with Ar gas, sputtering an Si target at 1.5 kW by using a DC electric source.

The Si—O—N layer had a refractive index of 1.65.

Further, each first protective layer in Examples 1 to 5 and Comparative Examples 1 to 3 was formed so as to be thickness shown in Table 2.

(Second Protective Layer)

A $(ZnS)_{80}(SiO_2)_{20}$ layer of the second protective layer was prepared by while supplying 10 sccm of Ar gas, sputtering a $(ZnS)_{80}(SiO_2)_{20}$ target at 2 kW by using an RF electric source. The $(ZnS)_{80}(SiO_2)_{20}$ layer had a refractive index of 2.3.

Further, each second protective layer in Examples 1 to 5 and Comparative Examples 1 to 3 was formed so as to be the thickness shown in Table 2.

($ZrO_2$—$Cr_2O_3$ Interface Layer)

A $ZrO_2$—$Cr_2O_3$ interface layer having a thickness of 5 nm was formed.

The $ZrO_2$—$Cr_2O_3$ interface layer was prepared by while supplying 30 sccm of Ar gas, sputtering a $ZrO_2$—$Cr_2O_3$ target at 1.5 kW by using an RF electric source.

(Bi—Ge—Te —)

A Bi—Ge—Te recording layer was prepared by while supplying 10 sccm of Ar gas, sputtering a Bi—Ge—Te target at 0.3 kW by using a DC electric source.

Further, each Bi—Ge—Te recording layer in Examples 1 to 5 and Comparative Examples 1 to 3 was formed so as to be the thickness shown in Table 2.

(Third Protective Layer)

A $Cr_2O_3$—$Ta_2O_5$ layer of the third protective layer having a thickness of 8 nm was formed.

The $Cr_2O_3$—$Ta_2O_5$ layer was prepared by while supplying 10 sccm of Ar gas, sputtering a $Cr_2O_3$—$Ta_2O_5$ target at 1.5 kW by using an RF electric source.

(Ag Alloy Reflective Layer)

An Ag alloy reflective layer was prepared by while supplying 10 sccm of Ar gas, sputtering an Ag alloy target at 0.5 kW by using a DC electric source.

Further, each Ag alloy layer in Examples 1 to 5 and Comparative Examples 1 to 3 was formed so as to be the thickness shown in Table 2.

($Cr_2O_3$—$Ta_2O_5$ Interface Layer)

A $Cr_2O_3$—$Ta_2O_5$ interface layer having a thickness of 3 nm was formed for preventing S from diffusing into the Ag alloy.

The $Cr_2O_3$—$Ta_2O_5$ layer was prepared by while supplying 10 sccm of Ar gas, sputtering a $Cr_2O_3$—$Ta_2O_5$ target at 1.5 kW by using an RF electric source.

(Fourth Protective Layer)

A $(ZnS)_{80}(SiO_2)_{20}$ layer of the fourth protective layer was formed in the same manner as in the second protective layer.

Further, each fourth protective layer in Examples 1 to 5 and Comparative Examples 1 to 3 was formed so as to be the thickness shown in Table 2.

TABLE 2

| | First protective layer | Second protective layer | Fourth protective layer | Reflective layer | Recording layer | |
|---|---|---|---|---|---|---|
| | Film thickness [nm] | Film thickness [nm] | Film thickness [nm] | Film thickness [nm] | Film thickness [nm] | Component |
| Ex. 1 | 30 | 10 | 30 | 11 | 5 | $Bi_{2.0}Ge_{47.5}Te_{50.5}$ |
| Ex. 2 | 30 | 12 | 30 | 11 | 5 | $Bi_{2.0}Ge_{47.5}Te_{50.5}$ |
| Ex. 3 | 30 | 14 | 30 | 11 | 5 | $Bi_{2.0}Ge_{47.5}Te_{50.5}$ |
| Ex. 4 | 30 | 16 | 30 | 11 | 5 | $Bi_{2.0}Ge_{47.5}Te_{50.5}$ |
| Comp. Ex. 1 | 30 | 18 | 30 | 11 | 5 | $Bi_{2.0}Ge_{47.5}Te_{50.5}$ |
| Ex. 5 | 30 | 15 | 35 | 9.4 | 5.3 | $Bi_{2.0}Ge_{47.5}Te_{50.5}$ |
| Comp. Ex. 2 | 0 | 30 | 30 | 8 | 6.6 | $Bi_{4.0}Ge_{48.6}Te_{47.4}$ |
| Comp. Ex. 3 | 0 | 26 | 40 | 8 | 6.6 | $Bi_{4.0}Ge_{48.6}Te_{47.4}$ |

<Preparation of Two Layers-Optical Recording Medium>

A two layers-optical recording medium was laminated, followed by the initial crystallization, and then the recording/reproducing properties of only a translucent recording/reproducing functional layer at the laser light incidence side was evaluated. Further, in the two layers-optical recording medium, a recording/reproducing functional layer at a far side from the laser light incidence side was formed by sputtering Nb (about 4.5 nm), an Ag alloy (about 125 nm), $Cr_2O_3$—$Ta_2O_5$ (about 3 nm), $(ZnS)_{80}(SiO_2)_{20}$ (about 8 nm), Ge—In—Sb—Te (about 12 nm), $ZrO_2$—ZnS (about 5 nm), $(ZnS)_{80}(SiO_2)_{20}$ (about 26 nm) and Si—O—N (about 10 nm) on a substrate having a guide groove and a thickness of 1.1 mm.

Further, the recording/reproducing functional layer at a far side from the laser light incidence side hardly influences on the property of the recording/reproducing functional layer at the incidence side.

A two layers-medium was prepared by forming a recording/reproducing functional layer at a far side from the laser light incidence side on a polycarbonate substrate having a guide groove and a thickness of 1.1 mm and forming a layer made of an UV curable resin having guide a groove and a thickness of 25 μm thereon.

Next, a translucent recording/reproducing functional layer at the laser light incidence side was formed, and a layer made of a UV curable resin having a thickness of 75 μm was formed thereon.

Both the guide grooves formed on the substrate having a thickness of 1.1 mm and on the layer made of a UV curing resin and having a thickness of 25 μm have a groove width of 0.195 μm, a groove depth of 20 nm and a groove pitch of 0.32 μm. Further, "groove" is defined as near from the laser light incidence side. The recording/reproducing functional layer was formed by sputtering method.

Further, two layers-optical recording media used in Examples 1 to 4 and Comparative Example 1 were continuously prepared, and the recording/reproducing property was evaluated. Then, each of two layers-optical recording medium used in Example 5, Comparative Example 2 and Comparative Example 3 was individually prepared, and the recording/reproducing property was evaluated.

Example 6

Further, the following optical recording medium for Example 6 was prepared and evaluated.

<Preparation of Single Layer-Optical Recording Medium>

An optical recording medium was prepared in the same manner as in Example 1, except that the film thickness of a fourth protective layer was changed to 34 nm, the film thickness of an Ag alloy reflective layer was change to 10 nm, the film thickness of a third protective layer was changed to 5 nm, a recording layer was made of $Bi_7Ge_{35}In_5Te_{53}$ (6.5 nm), the film thickness of a second protective layer was changed to 20 nm, and the film thickness of a first protective layer was changed to 15 nm.

<Preparation of a Two Layers-Optical Recording Medium>

A recording/reproducing functional layer at a far side from the laser light incidence side was prepared in the same manner as in Example 1.

[Results]

Results of Examples 1 to 6 and Comparative Examples 1 to 3 are shown in Table 3. Table 3 shows, from the left column, the film thickness of the first protective layer, the film thickness of the second protective layer, the film thickness of the fourth protective layer, the reflectivity, the positive and the negative of changing rates of the reflectivity d(R)/d(D2) and d(R)/d(D4) relative to the film thickness of the second protective layer and the fourth protective layer, the uniformity of the reflectivity, jitter (DOW10) after 10 times over-writing and jitter (DOW1000) after 1,000 times over-writing.

Here, the positive and the negative of the changing rates of the reflectivity relative to the film thickness of the second protective layer and the fourth protective layer d(R)/d(D2) and d(R)/d(D4) were selected by preparing samples wherein the film thickness of the second protective layer or the fourth protective layer was experimentally changed from the film thickness in Examples or Comparative Examples and measuring the reflectivity.

Further, double line in Table 3 means that experiments are not continued. Here, continued experiments means that respective optical recording media were continuously prepared, a film formation was carried out under a state such that the influence of a sputtering apparatus such as deterioration with time was little, and the states of the film thickness distribution were the almost same in respective optical recording media. Experiments after Example 5 were carried out while some samples for experiments other than the experiments shown in Table were prepared.

second protective layer was maximum, and the influence of the fourth protective layer was the second most.

Although $(ZnS)_{80}(SiO_2)_{20}$ tends not to have a uniform film thickness distribution, the film thickness distribution is influenced by the progress of erosion of a target at the time of film formation or the like. That is, since the film thickness distribution is influenced by electric power integration time or the like, a case where films are continuously formed is preferred

TABLE 3

| | Film thickness [nm] | | | | | | | | |
| | First protective layer | Second protective layer | Fourth protective layer | Reflectivity [%] | Positive and negative of $d(R)/d(D2)$ | Positive and negative of $d(R)/d(D4)$ | Uniformity of the reflectivity $(Rh - Rl)/Rh$ | Jitter [%] | |
| --- | --- | --- | --- | --- | --- | --- | --- | --- | --- |
| | | | | | | | | DOW10 | DOW1000 |
| Ex. 1 | 30 | 10 | 30 | 4.5 | − | + | 0.078 | 6.1 | 7.7 |
| Ex. 2 | 30 | 12 | 30 | 4.0 | − | + | 0.102 | | |
| Ex. 3 | 30 | 14 | 30 | 3.6 | − | + | 0.167 | | |
| Ex. 4 | 30 | 16 | 30 | 3.4 | − | + | 0.229 | 5.4 | 6 |
| Comp. Ex. 1 | 30 | 18 | 30 | 3.5 | + | + | 0.259 | | |
| Ex. 5 | 30 | 15 | 35 | 4.4 | − | + | 0.11 | 5.3 | 5.7 |
| Comp. Ex. 2 | 0 | 30 | 30 | 4.9 | + | + | 0.299 | 5.9 | 6.6 |
| Comp. Ex. 3 | 0 | 26 | 40 | 5.1 | + | + | | 5.7 | 14 |
| Ex. 6 | 15 | 20 | 34 | 5.1 | − | + | 0.082 | 6.0 | 6.4 |

<Discussion>

The jitter value of the optical recording medium is preferably at most 8.5%.

The value of the uniformity of the reflectivity ((Rh−Rl)/Rh) is preferably at most 0.25.

Examples 1 to 4 and Comparative Example 1

It is evident from the results of the reflectivity in Examples 1 to 4 and Comparative Example 1 that when the first protective layer was 30 nm, the reflectivity of the second protective layer became minimum at the vicinity of the film thickness of the second protective layer of 17 nm. Further, when the second protective layer was at least from 10 to 18 nm, the thinner the film thickness was, the better the uniformity of the reflectivity was. Such a large change the uniformity of the reflectivity means that the nonuniformity of $(ZnS)_{80}(SiO_2)_{20}$ which is a material of the second protective layer influences.

Further, it is considered that the uniformity of the reflectivity is improved in a region where the film thickness is thinner than a film thickness that the reflectivity is a local minimum, because the positive and the negative of the changing rates of the reflectivity relative to the film thickness of the second protective layer and the fourth protective layer are made to be inverse, and the influences of the change of the reflectivity of the second protective and the fourth protective layer which show similar tendency of the film thickness distribution are offset each other.

By assuming that each layer had a similar film thickness distribution in the calculation, the degree of the influence of the reflectivity distribution at the vicinity of the structure of Example 2 was estimated. As a result, the influence of the in order to obtain accurate results. Optical recording media in Examples 1 to 4 and Comparative Example 1 were formed by almost continuously forming films.

Comparative Example 2

An optical recording medium in Comparative Example 2 has no first protective layer and has a second protective layer having a thickness of 30 nm.

Although the structure having no first protective layer in Comparative Example 2 has an excellent rewriting durability since the thickness of the second protective layer is thick, the uniformity of the reflectivity is clearly inferior to Examples 1 to 6. Although experiments were not continuously carried out between Examples 1 to 4 and Comparative Example 1, it is evident that the structure tends to have an inferior uniformity of the reflectivity.

If only paying attention to the reflectivity, it is possible to thinner the film thickness of the second protective layer than the film thickness at the local minimum value of the reflectivity in the structure of Comparative Example 2. However, in such a case, it is impossible to improve the rewriting durability.

Comparative Example 3

An optical recording medium in Comparative Examples 3 has no first protective layer and has a second protective layer having a thickness of 26 nm. In Comparative Example 3, as a result of an optical simulation, it was calculated that $d(R)/d(D2)$ becomes zero, when the film thickness of the second protective layer is about 22 nm.

Accordingly, it is considered that when the film thickness of the second protective layer is thinner than 22 nm, the uniformity of the reflectivity is excellent. However, the rewriting durability clearly deteriorates when the film thickness is 26 nm. Therefore, it is difficult to make the second protective layer further thin.

The reason why the rewriting durability deteriorates is considered that since the distance between a recording layer and a UV curable resin layer at the light incidence side is too narrow, a resin layer is damaged by heat. Therefore, in a case where the film thickness of the first protective layer is thin, even the reflectivity is controlled by making the film thickness of the second protective layer thinner than the film thickness where the reflectivity is the minimum value, the rewriting durability cannot be improved.

That is, in Examples 1 to 5 wherein the second protective layer is relatively thin, the rewriting durability is excellent, because the first protective layer is thick.

Example 6

The film thickness of the second protective layer in Example 6 is 20 nm, which is thicker than that of Examples 1 to 4 and Comparative Example 1. However, d(R)/d(D2) is negative. The film thickness of the first protective layer is 15 nm, which is thinner than that of Examples 1 to 4 and Comparative Example 1. Thus, the state of the change of the reflectivity relative to the change of the film thickness of the second protective layer changed, and a film thickness of the second protective layer at which the reflectivity is a local minimum shifted to a higher film thickness side. Accordingly, the positive and negative of d(R)/d(D2) and d(R)/d(D4) became inverse, and the excellent uniformity of the reflectivity could be obtained.

Further, although the film thickness of the first protective layer is thinner than that of Examples 1 to 4, the film thickness of the second protective layer is thicker. Thus, the excellent rewriting durability could be maintained.
(Others)

Further, even in a case where the first protective layer is thick, if the second protective layer is thin, the uniformity of the reflectivity is improved, however, the rewriting durability tends to slightly deteriorate. This reason is considered as the deterioration at the vicinity of an interface between an Si—O—N layer and a $(ZnS)_{80}(SiO_2)_{20}$ layer. Because, when only a Si—O—N layer was made to be thick, the improvement was slight. However, when a $(ZnS)_{80}(SiO_2)_{20}$ layer (second protective layer) was made to be thick, the improvement resulted.

Further, the film thickness of the reflective layer or the film thickness of the recording layer in Examples were slightly different from that in Comparative Examples. However, it is considered that the rewriting durability at a level of 1,000 times would not be influenced by such a difference of the film thickness.

INDUSTRIAL APPLICABILITY

The application of the present invention is not particularly restricted. However, the present invention is particularly preferably employed for multilayer type optical recording media having plural recording layers.

This application is a continuation of PCT Application No. PCT/JP2010/060492, filed on Jun. 21, 2010, which is based upon and claims the benefit of priority from Japanese Patent Application No. 2009-149723 filed on Jun. 24, 2009. The contents of those applications are incorporated herein by reference in its entirety.

What is claimed is:

1. An optical recording medium having a translucent recording/reproducing functional layer which comprises at least a first protective layer, a second protective layer, a recording layer, a third protective layer, a reflective layer and a fourth protective layer in this order from the incidence side of laser light, wherein the second protective layer and the fourth protective layer are made of a material having the same constituting elements, wherein the refractive index of the second protective layer is higher by at least 0.3 than the refractive index of the first protective layer, and wherein, when the film thickness of the second protective layer is set as D2, the film thickness of the fourth protective layer is set as D4, and the reflectivity before recording when the laser light is focused on the recoding layer is set as R, the positive and negative of increasing rates d(R)/d(D2) and d(R)/d(D4) relative to the film thickness of R are inverse, wherein the second protective layer and the fourth protective layer are made of a material containing ZnS.

2. An optical recording medium having a translucent recording/reproducing functional layer which comprises at least a first protective layer, a second protective layer, a recording layer, a third protective layer, a reflective layer and a fourth protective layer in this order from the incidence side of laser light, wherein the second protective layer and the fourth protective layer are made of a material having the same constituting elements, wherein the refractive index of the second protective layer is higher by at least 0.3 than the refractive index of the first protective layer, and wherein, when the film thickness of the second protective layer is set as D2, the film thickness of the fourth protective layer is set as D4, and the reflectivity before recording when the laser light is focused on the recoding layer is set as R, the positive and negative of increasing rates d(R)/d(D2) and d(R)/d(D4) relative to the film thickness of R are inverse, wherein the first protective layer has a film thickness of at least 12 nm and a refractive index of from 1.30 to 1.80 at the wavelength of recording/reproducing laser light.

3. An optical recording medium having a translucent recording/reproducing functional layer which comprises at least a first protective layer, a second protective layer, a recording layer, a third protective layer, a reflective layer and a fourth protective layer in this order from the incidence side of laser light, wherein the second protective layer and the fourth protective layer are made of a material having the same constituting elements, wherein the refractive index of the second protective layer is higher by at least 0.3 than the refractive index of the first protective layer, and wherein, when the film thickness of the second protective layer is set as D2, the film thickness of the fourth protective layer is set as D4, and the reflectivity before recording when the laser light is focused on the recoding layer is set as R, the positive and negative of increasing rates d(R)/d(D2) and d(R)/d(D4) relative to the film thickness of R are inverse, wherein the second protective layer has a film thickness of at most 25 nm.

4. An optical recording medium having a translucent recording/reproducing functional layer which comprises at least a first protective layer, a second protective layer, a recording layer, a third protective layer, a reflective layer and a fourth protective layer in this order from the incidence side of laser light, wherein the second protective layer and the fourth protective layer are made of a material containing ZnS, wherein the first protective layer has a film thickness of at least 12 nm and a refractive index of from 1.30 to 1.80 at the wavelength of recording/reproducing laser light, and wherein the second protective layer has a film thickness of at most 25 nm.

5. The optical recording medium according to claim 1, wherein the recording layer is a phase change recording layer.

6. The optical recording medium according to claim 5, wherein the phase change recording layer has a composition represented by the formula $Ge_X Te_{1-X} (0.4 \leqq x \leqq 0.5)$ as the main component.

7. The optical recording medium according to claim 1, wherein the wavelength of recording/reproducing laser light is at most 450 nm.

8. The optical recording medium according to claim 1, wherein the first protective layer comprises Si, O and N.

9. The optical recording medium according to claim 1, wherein the second protective layer and the fourth protective layer are made of a material of $(ZnS)_{80}(SiO_2)_{20}$.

* * * * *